United States Patent [19]

Okudaira et al.

[11] Patent Number: 4,877,445
[45] Date of Patent: Oct. 31, 1989

[54] METHOD FOR PRODUCING A METAL FROM ITS HALIDE

[75] Inventors: Shigenori Okudaira, Ninomiya; Takefumi Irie; Hiroshi Uchida, both of Chigasaki; Eiichi Fukasawa, Samukawa; Kazuhiko Kobayashi, Chigasaki; Masanori Yamaguchi, Nakai, all of Japan

[73] Assignee: Toho Titanium Co., Ltd., Tokyo, Japan

[21] Appl. No.: 214,042

[22] Filed: Jun. 30, 1988

[30] Foreign Application Priority Data

Jul. 9, 1987 [JP] Japan .................... 62-169715

[51] Int. Cl.$^4$ .................... C22B 34/10; C01B 33/02
[52] U.S. Cl. .................... 75/0.5 B; 75/0.5 BB; 75/84.5; 423/350
[58] Field of Search ............ 75/0.5 B, 0.5 BB, 0.5 R; 423/348–350

[56] References Cited

U.S. PATENT DOCUMENTS

| | | | |
|---|---|---|---|
| 2,827,371 | 3/1958 | Quin ............................ | 75/26 |
| 2,997,385 | 8/1961 | Winter, Jr. .................... | 75/84.5 |
| 3,012,862 | 12/1961 | Bertrand et al. ............... | 23/223.5 |
| 4,383,852 | 5/1983 | Yoshizawa .................... | 75/0.5 B |

FOREIGN PATENT DOCUMENTS 736852  9/1955  United Kingdom .

OTHER PUBLICATIONS

Chemical Abstract, vol. 53, Jan. 10–Feb. 25, 1959, p. 12145i, "Apparatus for Continuous Production of Pure Titanium and Ziraconium."

Primary Examiner—Christopher W. Brody
Attorney, Agent, or Firm—Oblon, Spivak, McClelland, Maier & Neustadt

[57] ABSTRACT

A method for producing metal by the reduction of a metal halide by a reducing metal agent capable of continuously producing homogeneous metal of high purity. In the method, particles of the same metal as the metal to be produced are charged into a reaction vessel and the metal halide and the reducing metal agent both in vapor form, are ejected upwards into the reaction vessel from its lower portion to form a fluidized bed of the metal particles in the vessel. The reducing reaction between the two vapors takes place on the surface of the metal particles at a temperature below the melting point of the metal product and at a pressure below a vapor pressure of each of the reducing metal agent and the metal halide at that temperature, resulting in depositing and growing the metal product on the surface of the particles.

8 Claims, 1 Drawing Sheet

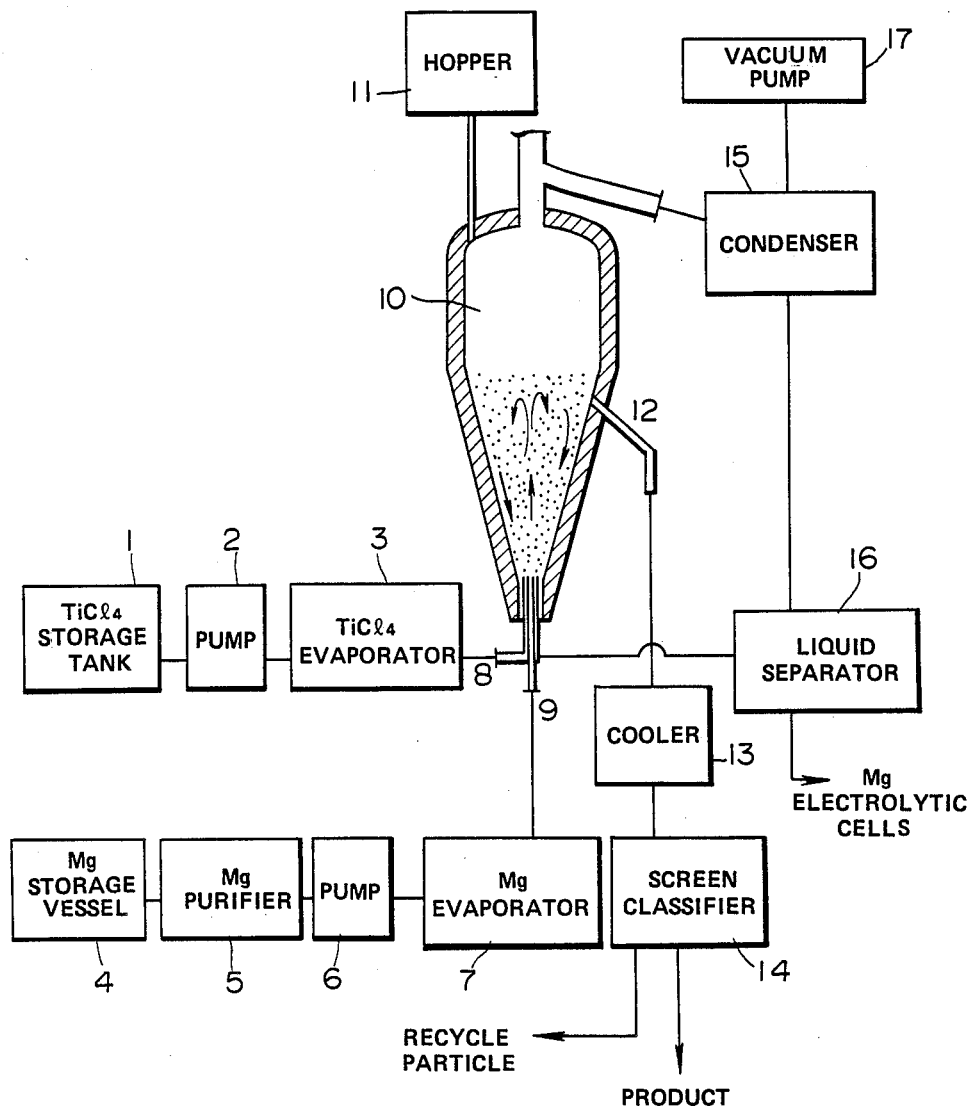

METHOD FOR PRODUCING A METAL FROM ITS HALIDE

BACKGROUND OF THE INVENTION

1. Field of the Invention

The present invention relates to a method for producing metal from a metal halide, and more particularly to a method for the production of a metal by the reduction of its metal halide by a reducing metal agent.

2. Description of the Prior Art

A conventionally known method for producing a metal by the reduction of its metal halide comprises the so-called Kroll process, which is particularly suitable for the production of titanium. Unfortunately, this process has a disadvantage in causing the metal product, for example, titanium to become firmly adhered to the side and/or bottom surfaces of the reaction vessel as a porous solid product during the production.

Another method known in the art is one in which a reaction takes place between titanium tetrachloride and magnesium on the surface of a titanium ribbon to produce titanium by depositing it on the surface. This is disclosed in Japanese Patent Publication No. 3004/1958. Unfortunately, this method causes the metal product to deposit on the ribbon and also on a frame supporting the ribbon.

Accordingly, the prior art fails to provide a continuous operation for producing titanium because of the necessity to remove the deposited metal prior to carrying out subsequent steps. For this reason, the prior art methods are compelled to employ a batch process which causes discontinuity and inefficiency in the manufacturing operation. Furthermore, solid titanium or the like deposited to the inner surface of the reaction vessel is readily contaminated by the material of the reaction vessel since it is highly reactive at the elevated process temperatures, to a degree sufficient to react the reactants, resulting in deterioration in the quality and purity of the metal product.

SUMMARY OF THE INVENTION

It is therefore an object of the present invention to provide a method for the production of a metal from its metal halide which is capable of continuously producing homogeneous metal of high quality by reduction of the metal halide.

According to the present invention, there is provided a method for producing a metal by the reduction of its metal halide using a reducing metal agent, characterized by the steps of: charging a reaction vessel with particles of the same metal as the metal product; injecting a gas upwards into the reaction vessel from its lower portion to cause the metal particles in the reaction vessel to form a fluidized bed of the metal particles; introducing the metal halide and reducing metal agent into the reaction vessel; and causing a reducing reaction of the metal halide with the reducing metal agent on the surface of the metal particles at a temperature below the melting point of the metal product and at a pressure below a vapour pressure of each of the reducing metal agent and the metal halide at the reaction temperature.

The metal particles serve as reaction nuclei. This then results in depositing and growing the metal product on the surface of the metal particles. The metal particles on which the metal product is deposited can be continuously tapped out from the reaction vessel.

The injected gas may comprise the metal halide and the reducing metal agent and is injected in vapour form from the lower portion of the reaction vessel to cause the metal particles to fluidize, in order to form the fluidized bed of the metal particles. Alternatively, the reducing metal agent may be fed in liquid form to a reaction zone in the reaction vessel while the injected gas comprises the metal halide injected upwards in vapour form from the lower portion of the reaction vessel to cause the metal particles to fluidize, in order to form the fluidized bed of the metal particles. Alternatively, the injected ga may be an inert gas injected upwards from the lower portion of the reaction vessel to cause the metal particles to fluidize in order to form the fluidized bed of the metal particles.

The metal halide may be titanium chloride, zirconium chloride, silicon chloride, tantalum chloride or niobium chloride. The reducing agent may be magnesium or sodium.

When the metal halide is titanium tetrachloride and the reducing agent is magnesium, the reaction may be carried out at a temperature in the range of 1000° C. to 1200° C., preferably at about 1100° C. The reaction may be carried out at a pressure in the range of 20 to 50 Torr, preferably 50 Torr.

DETAILED DESCRIPTION OF THE PREFERRED EMBODIMENT

The invention may be carried into practice in various ways and some embodiments will now be described by way of example with reference to the accompanying drawings in which the single FIGURE is a block diagram showing a system for practicing a method according to the present invention.

The following embodiment comprises the reduction of titanium tetrachloride to metal titanium using magnesium as a reducing agent.

As shown in the Figure, titanium tetrachloride feedstock is supplied at a predetermined rate from a storage tank 1 by means of a metering pump 2 to an evaporator 3. The titanium tetrachloride is heated to vaporize and then superheated in the evaporator 3.

Molten magnesium as a reducing agent is fed from a storage vessel 4 to a magnesium purifier 5 where it is passed through a filter, such as a titanium sponge layer so that impurities, such as iron, chromium, nickel and the like and also oxygen, nitrogen and the like remaining in the magnesium may be satisfactorily removed. The purified molten magnesium is then fed to a magnesium evaporator 7 by means of a pump 6 and heated to vaporize.

During these operations, the titanium tetrachloride evaporator 3 and the magnesium evaporator 7 may be kept substantially at an atmospheric pressure.

The titanium tetrachloride and magnesium vapours are then supplied at a predetermined rate through pipes 8 and 9 to a reaction vessel 10 and ejected from the bottom of the reactor vessel 10 through sePrate injection PiPes 8 and 9 into the reaction vessel 10.

The reaction vessel 10 is also supplied with a predetermined amount of titanium particles, which are to act as reaction nuclei from a hopper 11 located above the reaction vessel 10. The titanium particles are selected from commercially available titanium powders, fine titanium particles obtained from the production of titanium sponge, titanium chips produced from cutting titanium ingot and then further powdered.

The reaction vessel 10 is kept at a temperature below the melting point of the metal to be produced, and is evacuated to a lower pressure which prevents magnesium and magnesium chloride from being condensed at the temperature. The temperature in the reaction vessel 10 is preferably kept as low as possible to facilitate the selection of a material for the reaction vessel. However, the inner surface of the reaction vessel 10 is desirably kept at a temperature as high as possible and at a pressure as low as possible for the purpose of preventing magnesium and magnesium chloride from condensing on the inner surface. Also, in order to discharge magnesium chloride as a by-product of the reaction in the reaction vessel 10 and excess magnesium from the reaction system to recover them in liquid form in a condenser 15, the condenser 15 is preferably maintained at a higher pressure. In order to meet these contradictory requirements, the process of the present invention may be practiced under conditions where the temperature and pressure in the reaction vessel 10 are set at about 1100° C. and about 50 Torr, respectively.

The titanium tetrachloride and magnesium vapours supplied to the reaction vessel 10 are ejected upwards from the lower portion thereof because the reaction vessel 10 is maintained at a lower pressure, so that the energy imparted by the vapours due to their injection causes the titanium particles charged in the reaction vessel 10 to fluidize in the reaction vessel 10.

This fluidization of the titanium particles in the reaction vessel 10 may also be carried out by upwardly ejecting an inert gas such as argon from the lower portion of the reaction vessel 10 rather than using the energy imparted by the titanium tetrachloride and magnesium vapours, to form a fluidized bed of the titanium particles in the reaction vessel. In this case, the titanium tetrachloride and magnesium vapours may be ejected into the fluidized bed of the titanium particles, and then the magnesium somewhat in excess as compared to the stoichiometric amount may be supplied to the reaction vessel 10 in order to complete the reaction of the titanium tetrachloride and magnesium.

Injection of the titanium tetrachloride and magnesium vapours into the fluidized bed of the titanium particles in the reaction vessel 10 causes the intensive exothermic reaction between the two vapours. As a result, the magnesium reduces the titanium tetrachloride on the surface of the titanium particles which form the fluidized bed and which serve as reaction nuclei, according to the following reaction:

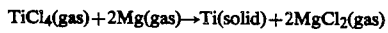

$$TiCl_4(gas) + 2Mg(gas) \rightarrow Ti(solid) + 2MgCl_2(gas)$$

The titanium thus produced due to the reaction on the surface of the titanium particles deposited on the surface of the titanium particles, so that the titanium particles gradually increase in diameter and weight in the fluidized state in the reaction vessel 10.

The temperature of the reaction zone in the reaction vessel is kept below the melting point of the metal product, and its pressure is kept below the vapour pressure of both magnesium and magnesium chloride at that temperature. This causes the titanium tetrachloride and magnesium to react in the vapour phase to produce the titanium depositing on the surface of the titanium particles while it is growing. At the same time, the magnesium chloride, as a by-product of the reaction, and the unreacted magnesium are discharged in a mixed gas from the reaction system without condensing in the reaction zone.

Carrying out the present invention under conditions in which the reaction zone is set at a temperature of 1100° C. and a pressure of 50 Torr causes the magnesium to be maintained in the vapour state in the reaction zone, since the vapour pressures of magnesium chloride and magnesium at this temperature are 86 Torr and 736 Torr, respectively. They are therefore discharged from the reaction zone without condensing to a subsequent cooling zone in which they are liquified or solidified for recovery.

The reducing reaction develops on the surface of the titanium particles to which the reaction product deposits, and promotes successive deposition and growth of the titanium. When the diameter of the titanium particles has increased to from twice to four times their initial diameter, the titanium particles are drawn out from the fluidized bed in the reaction vessel 10 continuously through a tapping port 12 to a cooler 13, in which the particles are water-cooled to a room temperature. The cooled titanium particles are removed via a valve, such as, for example, a rocker valve and charged to a screen classifier 14, which classifies the metal particles into a fine particle group with a diameter of 0.5 mm or less and a coarse particle group with a greater diameter. The coarse particle group is the product and the fine particle group is returned to the reaction vessel 10 via the hopper 11 for use as reaction nuclei.

The vapour mixture of magnesium chloride by-product and excess magnesium discharged from the reaction vessel 10 is directed to a condenser 15 where it is condensed to a liquid. The liquified magnesium chloride and magnesium are then collected through a "vacuum leg" into a liquid separator 16, that are separated from each other due to the difference in their densities. The separated magnesium is returned to the reaction vessel 10 for reaction and seParated magnesium chloride is recovered and fed to electrolytic cells (not shown).

In the FIGURE, reference numeral 17 designates a vacuum pump for reducing the pressure in the apparatus.

In a reaction system constructed as described above, vapours of titanium tetrachloride and magnesium are ejected into a reaction vessel maintained at a reduced pressure, and form a fluidized bed therein, so that the reducing reaction between them takes place on the surface of the titanium particles which act as nuclei for producing titanium. Accordingly, the titanium deposits and grows on the surface of the titanium particles without depositing on the wall of the reaction vessel, which is free from any contamination by the material of the wall of the reaction vessel. Also, in the present invention, the titanium particles which are used as reaction nuclei inherently have a larger specific surface area. This results in a significant increase in the efficiency of the reaction. Furthermore, in the present invention, the reaction zone is kept at a lower pressure. Accordingly, excess magnesium and any magnesium chloride by-Product which might otherwise remain in fine internal voides of the titanium particles are subjected to vacuum distillation while the titanium particles are fluidized in the reaction vessel, resulting in the production of metal particles of high purity which are substantially free from magnesium and magnesium chloride.

The above process has been described in connection with the production of metal titanium, however, it is to be understood that the present invention is also applicable to the production or manufacture of zirconium, silicon, tantalum, niobium and the like. Also, in the present invention, sodium may be used as a reducing metal agent.

The present invention will now be illustrated with reference to the following non-limiting examples.

EXAMPLE 1

A reaction vessel of 20 cm inner diameter and lined with titanium was charged with 12 kg of titanium particles having a diameter of about 0.2 to 2 mm, a surface area of about $12.6 \times 10^{-8}$ to $12.6 \times 10^{-6} m^2$ and a weight of about $18.8 \times 10^{-9}$ to $18.8 \times 10^{-6}$ kg. The reaction vessel was subjected to external heating and kept at a temperature of 1100° C. while the pressure in the reaction vessel was reduced to 50 Torr by a vacuum pump.

Titanium tetrachloride vapour superheated to 372° C. and magnesium vapour heated to 1120° C. were separately ejected from individual injection ports to the lower portion of the reaction vessel at feed rates of 7980 g/hr and 2539.2 g/hr. respectively so as to fluidize the titanium Particles in the reaction vessel.

Injection of the titanium tetrachloride and magnesium into the reaction vessel in this way resulted in a simultaneous reaction, which in turn resulted in the temperature in the reaction vessel tending to rise. In order to maintain the reaction vessel at desirable temperature, the external heating was controlled to keep the temperature at 1100° C.

After the reaction had been taking place for one hour, metal particles of 2012 g were drawn out from a tapping port. A residue of magnesium added in excess amount of 20% and magnesium chloride were cooled in a condenser and then separated by a liquid separator. As a result, magnesium chloride of 8465.8 g was recovered in liquid form.

The metal particles thus produced were formed of titanium deposited and grown on the surface of the titanium particles serving as reaction nuclei, and were substantially free from contamination by the material of the reaction vessel wall. Also, no magnesium chloride nor any of the excess magnesium remained in the fine internal voids of the metal particles. Thus, the metal product was very pure.

EXAMPLE 2

A reaction vessel of 30 cm inner diameter and lined with titanium was charged with 30 kg of titanium particles used in the Example 1. The reaction vessel was heated by an external heater and kept at a temperature of 1100° C. while the pressure in the reaction vessel was reduced to 50 Torr by means of an automatic pressure controller.

Titanium tetrachloride and magnesium vapours were separately ejected from individual injection ports to the lower portion of the reaction vessel at feed rates of 17.95 kg/hr and 5.7 kg/hr, respectively, so as to fluidize the titanium particles in the reaction vessel.

Injection of the titanium tetrachloride and magnesium into the reaction vessel in this way resulted in a simultaneous reaction, which in turn resulted in the temperature in the reaction vessel tending to rise. In order to maintain the reaction vessel at a desirable temperature, the external heating was controlled to keep the temperature at 1100° C.

After ten minutes, metal particles were started to be drawn out from a tapping port at a rate of 5.43 kg/hr. After cooling, the metal particles thus produced were subjected to screening, and particles of 0.5 mm or below were returned to the fluidized bed from the top of the reaction vessel at a rate of 0.9 kg/hr.

A magnesium chloride by-product and an excess magnesium, the total amount of which was 19.0 kg/hr, were condensed in a condenser maintained at 777° C. and obtained in liquid form through a vacuum leg.

The reaction was continued for five hours. The metal particles thus produced were formed of titanium deposited and grown on the surface of the titanium particles serving as reaction nuclei, and were substantially free from contamination by the material of the reaction vessel wall. Also, no magnesium chloride nor any of the excess magnesium remained in the fine internal voids of the metal particles. Thus, the metal product was very pure.

EXAMPLE 3

Example 1 was repeated except that the titanium tetrachloride and magnesium were injected into a reaction vessel in the form of gas and liquid and at feed rates of 8 kg/hr and 2.6 kg/hr, respectively.

The reaction proceeded in substantially the same manner as in Example 1. After two hours, the reaction was terminated and titanium particles of about 4.0 kg were recovered from the reaction vessel. The particles had a particle size of 0.3-2.2 mm and an average particle diameter of 0.8 mm.

COMPARATIVE EXAMPLE 1

A vapour phase reaction between titanium tetrachloride and magnesium was conducted under substantially the same conditions as Example 1 except that titanium particles were not charged into a reaction vessel initially.

It was observed that a small amount of titanium was produced on the wall of the reaction vessel. However, most of the product was discharged to a condenser in the form of lower chlorides to titanium without forming any metal titanium.

What is claimed as new and desired to be secured by Letters Patent of the United States is:

1. A method for producing a metal by the reduction of its metal halide using a reducing metal agent, characterized by the steps of: charging a reaction vessel with particles of the same metal as the metal product; injecting a gas upwards into the reaction vessel from its lower portion to cause the metal particles in the reaction vessel to form a fluidized bed of the metal particles; introducing the metal halide and reducing metal agent into the reaction vessel; and causing a reducing reaction of the metal halide with the reducing metal agent on the surface of the metal particles at a temperature below the melting point of the metal product and at a reduced pressure below the vapor pressure of each of the reducing metal agent and the metal halide at the reaction temperature.

2. A method as claimed in claim 1 characterized by continuously tapping the metal product deposited on the metal particles from the reaction vessel.

3. A method as claimed in claim 1 or claim 2, characterized in that the injected gas comprises the metal halide and the reducing metal agent and is injected in vapour form from the lower Portion of the reaction vessel to cause the metal particles to fluidize, in order to form the fluidized bed of the metal particles.

4. A metbod as claimed in claim 1 or claim 2 characterized in that tbe reducing metal agent is fed in liquid form to a reaction zone in the reaction vessel while the injected gas comprises the metal halide injected upwards in vapour form from the lower portion of the reaction vessel to cause the metal particles to fluidize, in order to form the fluidized bed of the metal particles.

5. A method as claimed in claim 1 or claim 2 characterized in that the injected gas is an inert gas injected upwards from the lower portion of the reaction vessel to cause the metal particles to fluidize in order to form the fluidized bed of the metal particles.

6. A method as claimed in any preceding claim characterized in that the metal halide is titanium chloride, zirconium chloride, silicon chloride, tantalum chloride or niobium chloride.

7. A method as claimed in any preceding claim characterized in that the reducing metal agent is magnesium or sodium.

8. A method as claimed in any preceding claim characterized in that the reaction is carried out at a temperature of 1100° C. and a pressure of 20-50 Torr.

* * * * *